United States Patent [19]

Brinson

[11] Patent Number: 5,429,514

[45] Date of Patent: Jul. 4, 1995

[54] INSTRUCTIONAL KIT HAVING STORAGE/WORK TRAY AND INDICIA BEARING BLOCKS

[76] Inventor: Gaylord A. Brinson, Box #5, Mt. Summit, Ind. 47361

[21] Appl. No.: 179,323

[22] Filed: Jan. 10, 1994

[51] Int. Cl.⁶ .............................................. G09B 1/04
[52] U.S. Cl. .................................................... 434/172
[58] Field of Search ............... 434/172, 175, 167, 156, 434/128; 273/299, 272, 281.1

[56] References Cited

U.S. PATENT DOCUMENTS

| | | | |
|---|---|---|---|
| 456,708 | 7/1891 | Preston | 273/299 X |
| 3,503,612 | 3/1970 | Singer | 273/272 |
| 4,811,954 | 3/1989 | Hommann | 273/283 |
| 5,028,048 | 7/1991 | Watson et al. | 273/148 A |
| 5,054,789 | 10/1991 | Pellerin | 273/288 |
| 5,092,777 | 3/1992 | Crowe | 434/159 |
| 5,139,271 | 8/1992 | Bez | 273/272 |
| 5,145,185 | 9/1992 | Yu et al. | 273/287 |

*Primary Examiner*—Cary E. O'Connor
*Assistant Examiner*—Jeffrey A. Smith
*Attorney, Agent, or Firm*—Norman B. Rainer

[57] ABSTRACT

An instructional game-like kit is provided including a tray of rectangular contour bounded by two long sidewalls and two short sidewalls, and a lid hingedly and removably joined to one long sidewall. The tray contains two storage regions adjacent the short sidewall, and a centrally disposed work region bounded by the two long sidewalls and the two storage regions. Upright parallel rails positioned in the storage regions define rows that slidably accommodate cubic blocks that contain indicia on each surface. The centrally disposed work region contains upraised ridges defining channels adapted to receive the block in a manner to form work or mathematical expressions.

6 Claims, 4 Drawing Sheets

| CAPITAL LETTERS | No. | LITTLE LETTERS | No. | SIGNS | No. | FIGURES | No. |
|---|---|---|---|---|---|---|---|
| A | 8 | a | 27 | . | 15 | 1 | 30 |
| B | 8 | b | 25 | ' | 15 | 2 | 15 |
| C | 8 | c | 25 | = | 6 | 3 | 15 |
| D | 8 | d | 27 | ! | 6 | 4 | 15 |
| E | 8 | e | 26 | : | 3 | 5 | 15 |
| F | 8 | f | 25 | ● | 3 | 6 | 15 |
| G | 8 | g | 25 | ¢ | 6 | 7 | 15 |
| H | 8 | h | 25 | $ | 10 | 8 | 15 |
| I | 8 | i | 25 | + | 15 | 9 | 15 |
| J | 8 | j | 25 | - | 25 | 0 | 30 |
| K | 8 | k | 25 | ; | 4 | | |
| L | 8 | l | 25 | / | 3 | | |
| M | 8 | m | 25 | ? | 6 | | |
| N | 8 | n | 25 | % | 10 | | |
| O | 8 | o | 25 | # | 6 | | |
| P | 8 | p | 25 | ( | 4 | | |
| Q | 8 | q | 25 | ) | 4 | | |
| R | 8 | r | 25 | " | 5 | | |
| S | 8 | s | 27 | " | 5 | | |
| T | 8 | t | 27 | * | 3 | | |
| U | 8 | u | 25 | & | 3 | | |
| V | 8 | v | 25 | x | 15 | | |
| W | 8 | w | 25 | ÷ | 5 | | |
| X | 8 | x | 25 | | | | |
| Y | 8 | y | 25 | | | | |
| Z | 8 | z | 25 | | | | |
| TOTAL | 208 | | 659 | | 177 | | 180 |

FIG. 5

INSTRUCTIONAL KIT HAVING STORAGE/WORK TRAY AND INDICIA BEARING BLOCKS

BACKGROUND OF THE INVENTION

1. Field of the Invention

This invention relates to educational games, and more particularly concerns a segmented storage box having a plurality of components with which words, sentences, and mathematical expressions may be constructed.

2. Description of the Prior Art

Numerous educational block and tile alphabet games have been disclosed in the prior art. Various boxes have been employed which provide convenient storage and transport as well as a playing surface for game pieces. For example, U.S. Pat. No. 5,054,789 to Pellerin discloses a board game having twenty-six segmented spaces, each adapted to contain a block inscribed with numbers or one each of the twenty-six characters in the English alphabet. The Pellerin game is played by matching tiles and blocks having corresponding characters, then removing the blocks from the segmented game board. U.S. Pat. No 5,139,271 to Bez discloses a word game played upon a segmented game board. The Bez game is played upon a color coded board upon which color blocks depicting alphabetic characters are withdrawn from a sectioned storage tray and placed upon the board to make words. U.S. Pat. No. 5,092,777 to Crowe discloses a set of blocks having alphabetic characters and indicia identifying succeeding and preceding characters. The Crowe game is played with a set of twenty six playing cards having alphabetic characters and point value indicia which are used to control play and tally a score.

Although the aforesaid games contain pieces having alphabetic and numeric indicia, they are not adapted to allow the construction of words, sentences and mathematical expressions. The Pellerin apparatus emphasizes the learning and recognition of alphabetic and numeric characters by simple matching. The Bez game emphasizes the spelling of words and vocabulary expansion by allowing the player to spell words, but does not teach mathematical expressions or sentence construction. The Crowe apparatus does not employ a segmented box which may be used for construction of sentences and mathematical expressions.

Other apparatus have been disclosed in the prior art which are not used in conjunction with tiles or blocks, but have segmented or folding cases which are used for storage and play. U.S. Pat. No. 4,811,954 to Hemmann discloses a portable game board assembly comprised of a pair of elongated tray elements hinged along one elongated side and open along that side between the hinge elements. The tray elements may be pivoted into a closed position to define a container. U.S. Pat. No. 5,028,048 to Watson et al. discloses a game carrying and playing device including a case having a top, bottom, front, back, and sides. The top includes a surface for supporting one or more game cards. The game box also includes a compartmentalized tray for holding game pieces and cards. None of the aforesaid patents disclose the use of segmented compartments which are used to organize blocks which display letters and numbers, or perform mathematical operations, or build words and sequences of words.

It is accordingly an object of the present invention to provide an instructional kit of a game-like nature having a compartmentalized box containing play areas and storage areas for components of the kit.

It is another object of the present invention to provide a kit of the aforesaid nature having a plurality of cubic blocks having different alphabetic or numeric indicia on each side.

It is a further object of this invention to provide a kit of the aforesaid nature having segments of board area adapted to arrange said blocks in order to construct words, sentences and mathematical expressions.

It is yet another object of this invention to provide a kit of the aforesaid nature which is simple to use, durable in construction and amenable to low cost manufacture.

These and other beneficial objects and advantages will be apparent from the following description.

SUMMARY OF THE INVENTION

The above and other beneficial objects and advantages are accomplished in accordance with the present invention by an instructional game-like kit comprised of:

a) a rectangular box-like enclosure comprised of a tray member and a lid disposed thereabove, and b) a plurality of uniformly sized cubic blocks, each surface of which bears single indicia selected from the group consisting of letters of an alphabet, numbers, punctuation marks, and mathematical operator symbols, c) said tray member defined by a flat bottom panel and upwardly directed long and short perimetric sidewalls, said bottom panel having two storage regions disposed adjacent said short sidewalls for the orderly storage of said blocks, and a centrally disposed portion constituting a work area for the manipulative arrangement of said blocks into meaningful sequences.

Said storage portions contain a series of parallel elongated fixed rails upwardly emergent from said panel and forming a multiplicity of uniformly sized storage rows adapted to slidably secure said blocks. The rails have a height above the panel less than the height of the blocks, thereby facilitating removal of the blocks.

Said centrally disposed portion of the bottom panel preferably contains a plurality of upraised ridges embracing indicia for instructing word formation or mathematical operation. Movable elongated rails are provided for retaining blocks stored within said rows.

The lid is preferably constructed such that, when disposed above the interior region so as to seal the enclosure, it abuts the uppermost surfaces of said blocks, thereby preventing movement of the blocks during transport of said kit. The lid is preferably pivotably associated with the upper extremity of the sidewall along a long sidewall of the enclosure but is preferably detachable from the box, thereby permitting storage beneath the box during use of the kit. The lid and bottom panels of the box may have thicknesses of about ¼", and the box may measure about 11" by 17".

The tray and lid may each be of monolithic construction and fabricated from a thermoplastic resin by way of an injection molding process. The tray may have indicia inscribed upon said bottom panel and rails to indicate which blocks are stored in each row. The interior surface of the lid may have an auxiliary work area which is employable when the lid is in a horizontal position. The work areas may have various graphics illustrating examples of block disposition, or pie charts illustrating percentages. The work areas contain instructive indicia relative to the use of alphabet letters or mathematical functions such as addition, substraction, multiplication and division.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing:

FIG. 5 tabulates the indicia that appear on the blocks.

DESCRIPTION OF THE PREFERRED EMBODIMENT

Figure 1:
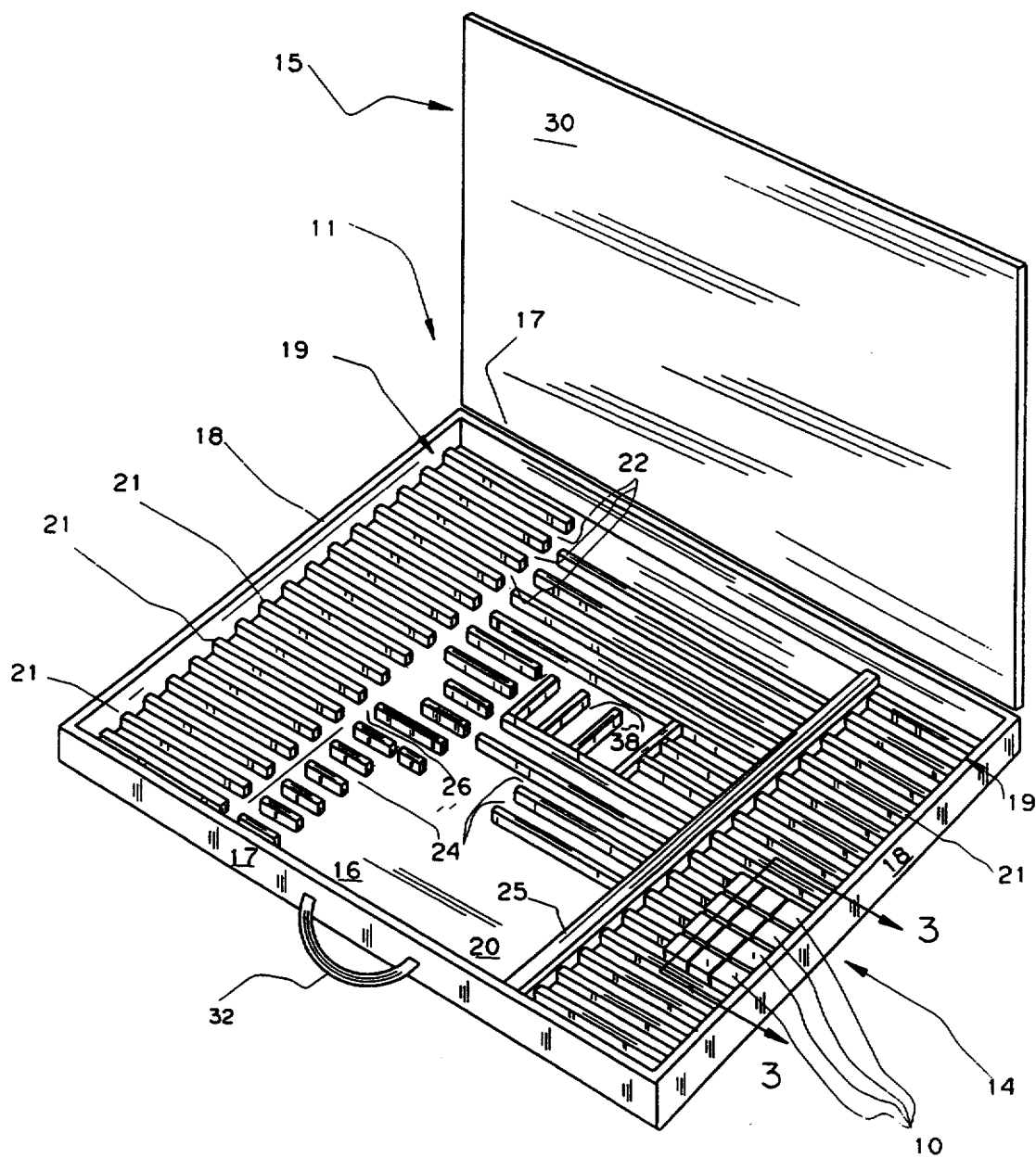
FIG. 1 is a perspective view of an embodiment of the instructional kit of the present invention.
Figure 2:
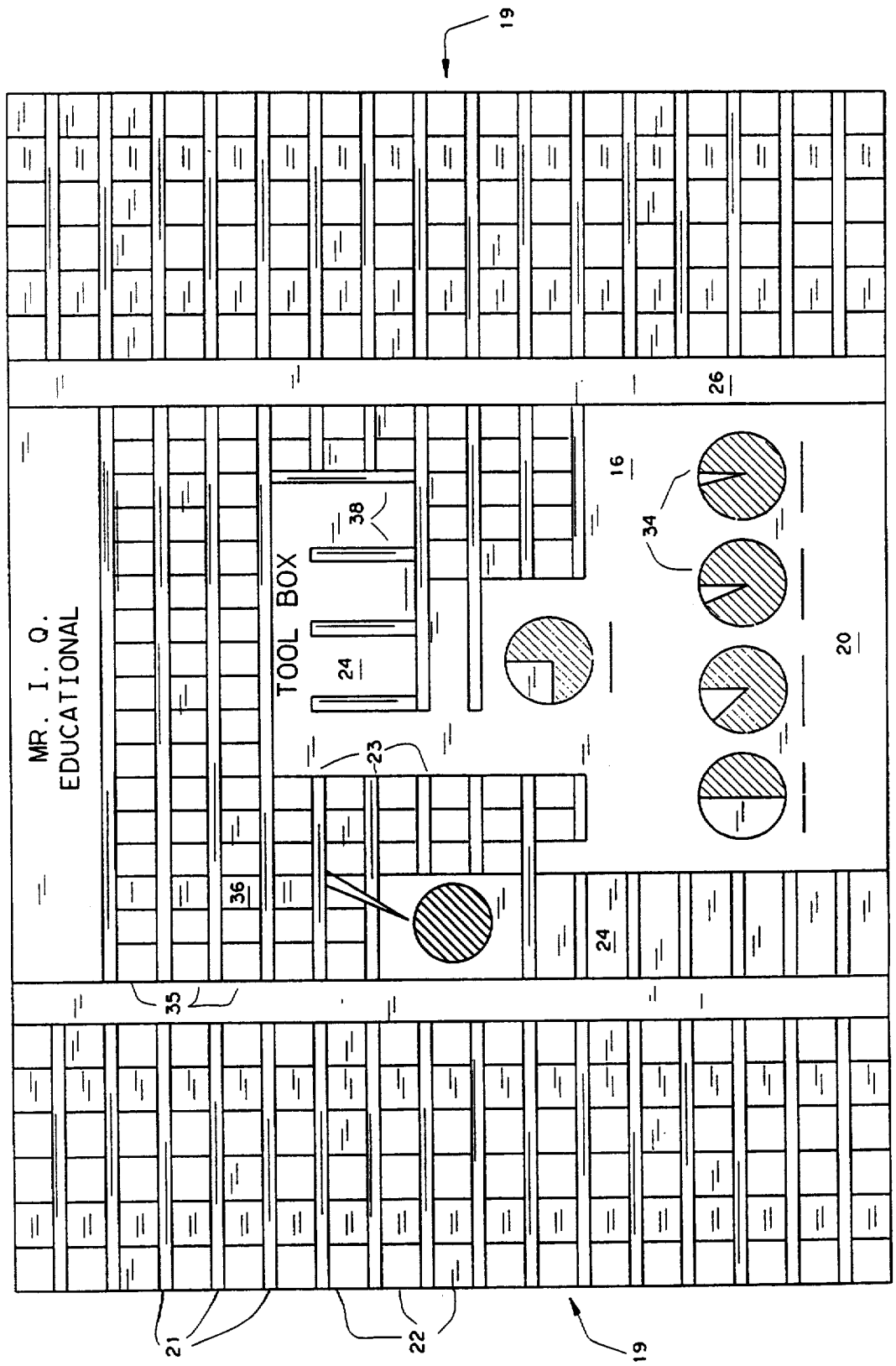
FIG. 2 is a top view of the interior of the kit of FIG. 1.
Figure 3:
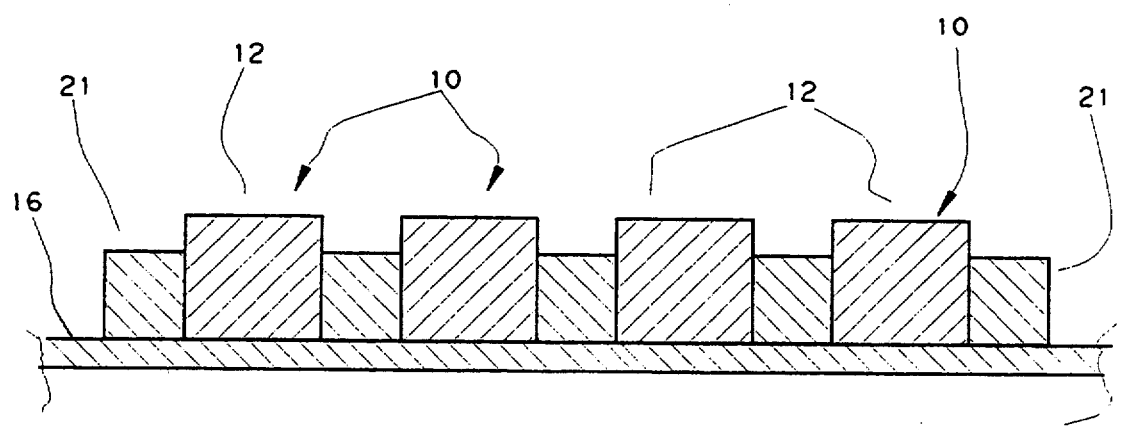
FIG. 3 is a fragmentary sectional side view taken upon the 3—3 line of FIG. 1.
Figure 4:
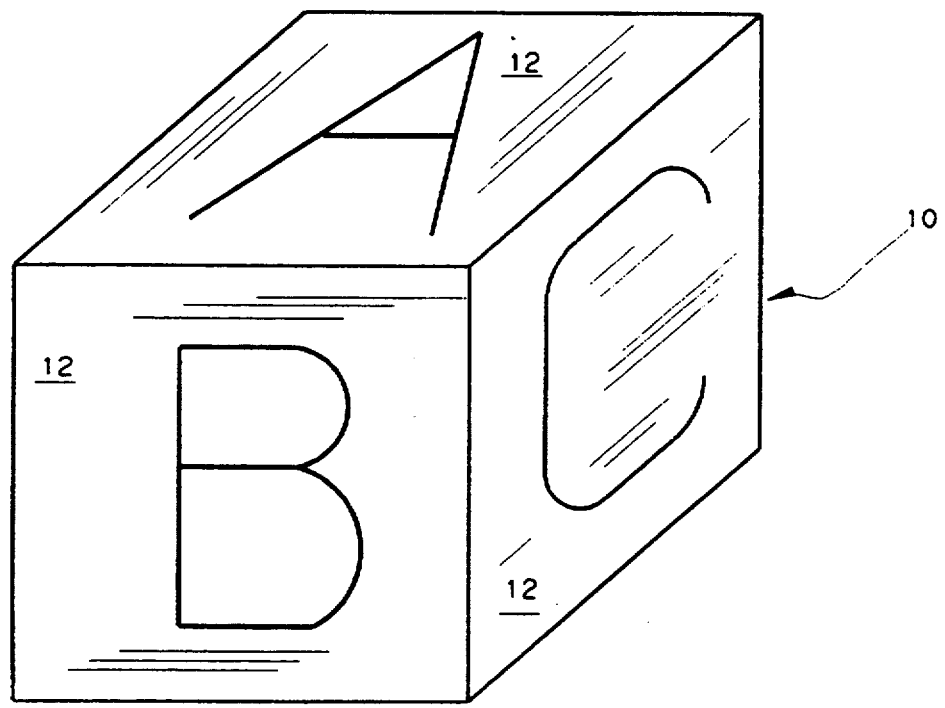
FIG. 4 is a perspective view of a block employed in the kit of FIG. 1.

Referring to FIGS. 1-5, an embodiment of the kit of the present invention is shown comprised of blocks 10 and box-like enclosure 11 comprised of tray member 14 and lid 15.

Said blocks are of cubic contour, having a size preferably of $\frac{1}{2}$" cube. Six active surfaces 12 of each cube contain a single indicia selected from the group consisting of letters of an alphabet, numbers, punctuation marks and mathematical symbols. The blocks may be constructed of plastic, wood or ceramic.

Tray member 14 is bounded by flat bottom panel 16 and upwardly directed long sidewalls 17 and short sidewalls 18. Two identical storage regions 19 of panel 16 are disposed as separate zones adjacent said short sidewalls. A centrally disposed portion 20 of panel 16 is bounded by opposed long sidewalls 17 and the two storage regions 19.

Said storage regions serve to provide for orderly storage of said blocks, and accordingly contain a series of parallel elongated fixed rails 21 upwardly emergent from said panel and forming seventeen uniformly sized storage rows 22, each adapted to slidably secure six of said blocks. Rails 21 rise above panel 16 by a height which is smaller than the height of the blocks. This relationship enables the blocks to be easily removed from and restored to storage rows 22. The rails will typically have a height of $\frac{3}{8}$", a thickness, measured transversely to the height direction, of about $\frac{1}{4}$", and a length of about 3". The rails may be attached to panel 16 by conventional means, or may be integral therewith as portions of a monolithic structure formed of thermoplastic polymer by way of a molding operation. The exemplified embodiment of the box, having 34 storage rows of the aforesaid dimensions, will hold 204$\frac{1}{2}$" cubic blocks.

Centrally disposed portion 20 of panel 16 constitutes a work area for the manipulative arrangement of said blocks into meaningful sequences such as words, sequences of words, or mathematical expressions. Said centrally disposed portion contains a plurality of upraised horizontal and vertical ridges 23 and 38, respectively, defining therebetween channels 24. Said channels and adjacent areas of panel 16 may contain instructional indicia 34 relating to word formation or mathematical expressions or concepts. It is to be noted that three long horizontal channels 35 are disposed adjacent uppermost long sidewall 17, each of said long channels having seventeen delineated spaces 36 for the placement of blocks. It is important that the number of said spaces corresponds to the number of storage rows 22. It is further noted that the horizontally disposed ridges 23 are in alignment with the rails 21 of the storage regions.

Removable elongated retainer rails 25 are disposable in a separator path 26 orthogonal to long sidewalls 17 and laterally bounded by the extremities of ridges 23 and rails 21. The function of rails 25 is to retain blocks within their stored positions in rows 22. For purposes of clarity of illustration, only one retainer rail 25 is shown in FIG. 1.

Lid 15 is pivotably and removably joined to the top of sidewall 17. The interior face 30 of lid 15, when in the closed or sealing position of the lid, abuts the uppermost surfaces of said blocks. This secures the blocks against movement when the kit is transported. A locking latch may be provided for the lid, and a carrying handle 32 may be associated with tray member 14.

As shown in FIG. 5, the blocks may, for example bear indicia representative of 208 capital letters, 659 little letters, 177 mathematical and literary symbols, and 180 numerals. The total of said indicia add up to 1224, representing the six surfaces of 204 blocks.

While particular examples of the present invention have been shown and described, it is apparent that changes and modifications may be made therein without departing from the invention in its broadest aspects The aim of the appended claims, therefore, is to cover all such changes and modifications as fall within the true spirit and scope of the invention.

Having thus described my invention, what is claimed is:

1. An instructional kit comprised of:
   a) a rectangular box-like enclosure comprised of a tray member and a lid disposed there above, and
   b) a plurality of uniformly sized cubic blocks, each surface of which bears single indicia selected from the group consisting of letters of an alphabet, numbers, punctuation marks, and mathematical operator symbols,
   c) said tray member defined by a flat bottom panel and upwardly directed long and short perimetric sidewalls, said bottom panel having two storage regions disposed adjacent said short sidewalls for the orderly storage of said blocks, and a centrally disposed portion bounded by said storage regions and long sidewalls constituting a work area for the manipulative arrangement of said blocks into meaningful sequences, said storage regions having a series of parallel rails in uniformly spaced apart relationship to define there between rows for slidably receiving said blocks, said centrally disposed portion containing spaced apart vertical ridges and horizontal ridges which align with said rails.

2. The kit of claim 1 wherein said tray member and lid are hingedly and removably interconnected along one long sidewall.

3. The kit of claim 1 further comprised of 204 blocks.

4. The kit of claim 1 wherein seventeen rows exist in each storage region.

5. The kit of claim 4 wherein at least four horizontal ridges within said centrally disposed portion define therebetween three channels that can each accommodate seventeen blocks.

6. The kit of claim 1 further comprising two moveable elongated rails that retain blocks within the rows of said storage regions.

* * * * *